Figure 6:
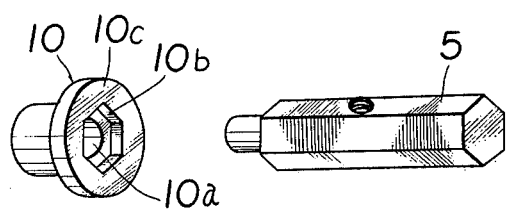

United States Patent [19]

Kine

[11] 4,084,449
[45] Apr. 18, 1978

[54] BRAKE LEVER FOR A BICYCLE

[75] Inventor: Masayoshi Kine, Sakai, Japan

[73] Assignee: Shimano Industrial Company Limited, Osaka, Japan

[21] Appl. No.: 708,113

[22] Filed: Jul. 23, 1976

[30] Foreign Application Priority Data

Aug. 1, 1975 Japan .................................. 50-107780

[51] Int. Cl.² ...................... G05G 11/00; B62K 23/06; B62L 3/02
[52] U.S. Cl. .................................... 74/480 R; 74/489; 74/522
[58] Field of Search ...................... 74/480 R, 488, 489, 74/522

[56] References Cited

U.S. PATENT DOCUMENTS

| 2,188,635 | 1/1940 | Dusen, Jr. | 74/522 X |
| 3,861,234 | 1/1975 | Cristie | 74/480 R |
| 3,875,818 | 4/1975 | Yoshigai | 74/480 R |

Primary Examiner—Allan D. Herrmann
Attorney, Agent, or Firm—Stevens, Davis, Miller & Mosher

[57] ABSTRACT

A brake lever mounted to a drop type handle for a bicycle, comprising a main lever substantially parallel to a bent rod section and an auxiliary lever parallel to a straight rod section of the drop type handle. The auxiliary lever is shiftable in pivoted position from the main lever so that the strokes of both levers may cause substantially equal strokes of a control wire and so that the grip dimension, the distance between the auxiliary lever and the straight rod section, may be adjusted.

5 Claims, 7 Drawing Figures

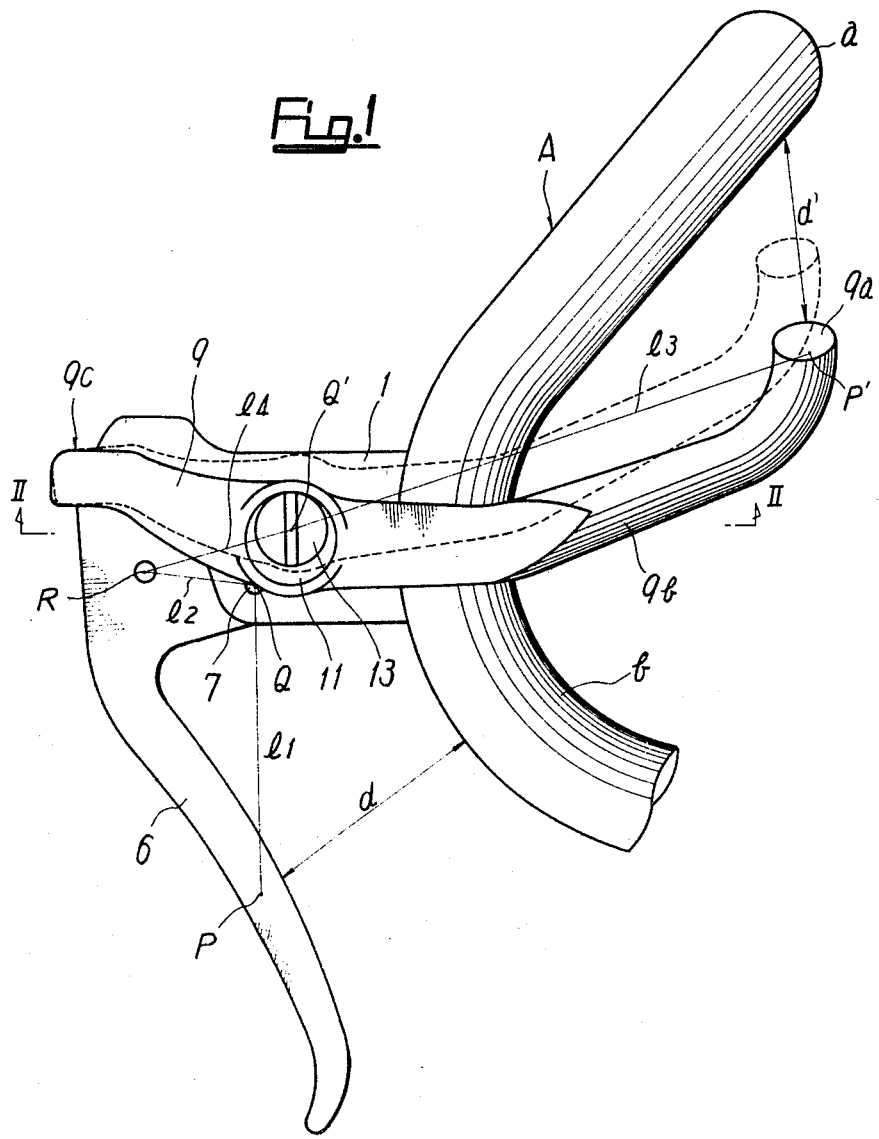

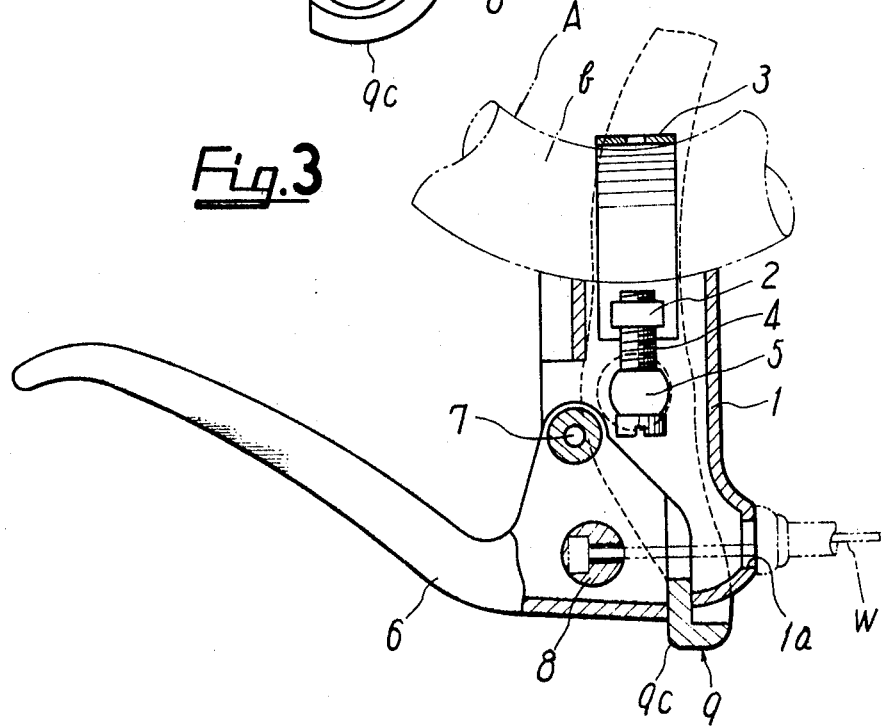

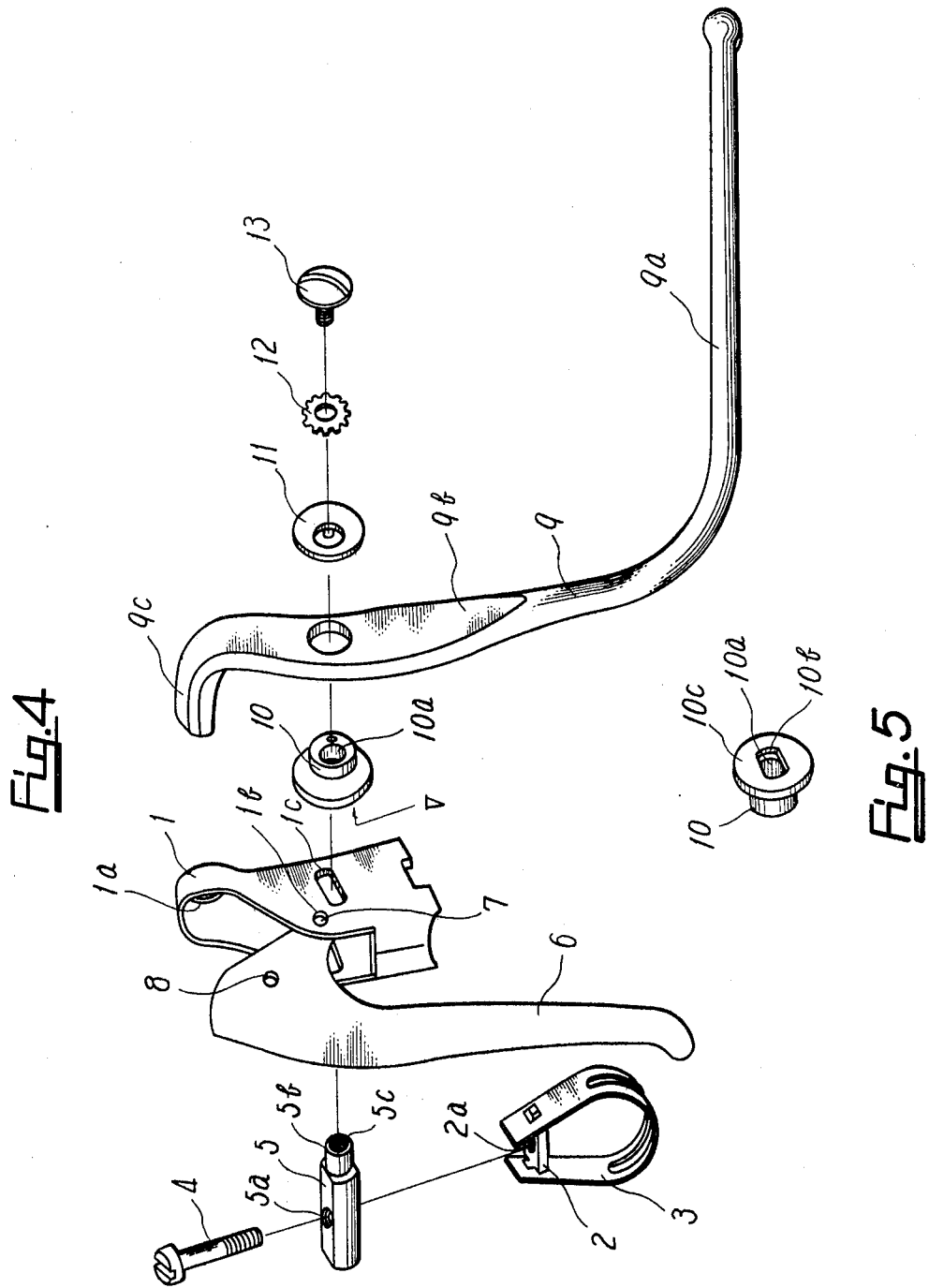

BRAKE LEVER FOR A BICYCLE

This invention relates to a brake lever attached to a drop type bicycle handle comprising a straight rod section and bent rod sections of U-like shape bent downward and forward from both ends of the straight rod section.

A brake lever having an auxiliary lever of approximately L-like shape substantially parallel to the straight rod and a bent rod section of the drop type bicycle handle, to be hereinafter called the drop handle, and a main lever substantially parallel to the bent rod section, pivoted to a bracket means attached to the handle, so that the bicycle brake may be controlled by both the main and auxiliary lever, has hitherto been disclosed in U.S. Pat. No. 3,403,577.

The brake lever has the auxiliary lever pivoted to the bracket means by use of the pivot for the main lever and, the auxiliary lever is pivoted at a predetermined position with respect to the bracket.

Accordingly, the brake lever causes, first, the stroke of a control wire to be considerably different from between the lever stroke of the main lever and that of the auxiliary lever, resulting in a smaller wire stroke by the latter even though both lever strokes are equal. In other words, the auxiliary lever stroke should be considerably greater than the main lever stroke for obtaining an equal wire stroke. Second, the auxiliary lever, in its regular pivoted position, inevitably varies the distance between the lever's grip parallel to the straight rod section of the drop type handle and the straight rod section, which distance is to be hereinafter called the grip dimension, because the drop type handle is usually of nonuniform shape, especially at the U-like bent section. As a result the braking effect is not constant. U.S. Pat. No. 3,861,234 has suggested that the grip dimension can, for eliminating the above defect, be changed by means of a pair of auxiliary levers interchangeably connected to the brake levers at both ends of the drop type handle. The grip dimensions are restricted in a given range and are not adjusted with a single auxiliary lever.

The invention, intends to solve the aforesaid problems by improving conventional brake levers. A main object of the invention is to provide a brake lever capable of making the wire stroke of a control wire with respect to the stroke of an auxiliary lever close to, and preferably equal to, the stroke of the control wire with respect to a main lever so that both levers may control the brake through substantially equal strokes of the levers. Another object is to provide a brake lever having an easily adjustable grip dimension between the auxiliary lever and the straight rod section of the drop handle, regardless of the configuration of the drop handle.

The invention has been designed to arrange the auxiliary lever pivoted at a position more remote from a wire retainer than the pivoted position of the main lever at a bracket and also to enable the auxiliary lever to be shiftable of its pivoted position to the bracket so as to adjust the aforesaid grip dimension. In greater detail, the pivot of the auxiliary lever is insertably mounted to a mounting shaft non-rotatably attached to the bracket means in the relation that the pivot and shaft are eccentric so that the pivot may be insertably shifted around the axis of the mounting shaft to thereby easily adjust the grip dimension.

Figure 7:
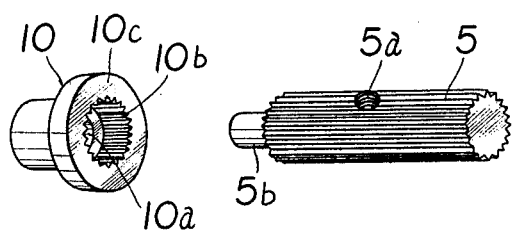

The objects and features of the invention and others will be apparent from the following description of embodiments in accordance with the accompanying drawings, in which FIG. 1 is a front view showing the brake lever of the invention, attached to the drop type handle, FIG. 2 is a sectional view taken on line II—II in FIG. 1, FIG. 3 is a partially cutaway rear view of the auxiliary lever omitted at its foremost end, FIG. 4 is a perspective exploded view of the brake lever, FIG. 5 is a perspective view of only the pivot among the parts of the auxiliary lever in FIG. 4, showing the opposite side thereof FIG. 6 is a first alternative embodiment of parts of the invention, and FIG. 7 is a second alternative embodiment of parts of the invention.

In the drawings the drop type handle A of the invention is not detailed because it is well known as diclosed in U.S. Pat. No. 3,403,577. The drop type handle comprises, as schematically shown in FIG. 1, a straight rod section a and a bent rod section b of a U-like shape bending downward and forward from both ends of the former.

Referring to the drawings, the reference numeral 1 designates a bracket means fixed at substantially the central portion of the bent rod section b of the drop type handle A. The bracket means 1 has a square conical base, a wire inserting bore 1a perforated at one side of the foremost end portion of the bracket 1, an axial bore 1b for pivoting therethrough a main lever to be hereinafter described, and slots for inserting thereinto the auxiliary lever mounting rod at both opposite side walls respectively.

The bracket means 1 is, as shown in FIGS. 3 through 4, composed of a tight band 3 retained at both ends to a connector 2, a mount bolt 4 screwed into a threaded bore 2a formed in the connector 2, and a support rod 5 for supporting the bolt 4 with respect to the bracket 1. The mount bolt 4 is, while the support rod 5 is being carried by the bracket 1, inserted through a bore 5a in the rod 5 and screwed into the threaded bore 2a and then both legs of the tight band 3 are inwardly tightened, whereby the bracket means 1 is secured to the bent rod section b of the handle.

In addition, in the embodiment shown in the drawings, the support rod 5 serves to insertably support therewith a pivot, to be hereinafter described, of the auxiliary lever and is insertably supported through the bore 1c formed in both of the opposite side walls of the bracket 1. The support rod 5, as shown in FIG. 4, is flattened on both sides so as to be non-circular in cross section; is axially longer than the distance between the side walls of the bracket 1 so as to project at one end outwardly of one of the side walls when insertably supported on the bracket; and is provided with a tubular spindle 5b, internally threaded at 5c, which projects from the tip of one end of the rod 5.

The reference numeral 6 designates a main lever pivoted to the bracket means 1 through the lever sprindle 7 and has a retainer 8 for retaining one terminal of a control wire W introduced into the bracket 1 through a bore 1a. The reference numeral 9 designates an auxiliary lever pivotally located on the bracket at a point more remote from the retainer 8 than the main lever's pivot. The auxiliary lever 9 is substantially L-like shaped and composed of parts 9a and 9b substantially parallel to the straight rod section a and bend rod section b respectively. The part 9a and about a half of the part 9b are rod-like shaped, the remainder of the latter and a head 9c are flattened, and the head 9c extends from the part 9b at a right angle relative thereto.

A pivot 10, for pivotally attaching the auxiliary lever 9 to the bracket means 1, is insertably mounted over the non-circular extension of the rod 5 extending out of the bracket and has, at the central portion, a round bore 10a insertably engageable with the internally threaded tubular spindle 5b. The pivot 10 also has a slot 10b engageable with the non-circular extension of the rod 5. The pivot 10 is eccentrically mounted on the support rod 5, i.e., the axis of the pivot 10 and the center of the slot 10b are not identical, so that the auxiliary lever's pivoting position may be shifted around the axis of the support rod 5.

In the drawings, 10c is a flange, surrounding the slot 10b of the pivot 10, which functions as a washer for the auxiliary lever at one side thereof. 11 is a washer at the other side of the auxiliary lever, 12 is a lock washer and 13 is a set screw.

In the aforesaid construction, the support rod 5 is used as the mount spindle, but may be separated therefrom, and may, other than the section shown in the drawings, be polygonal in section as shown in FIG. 6, or circular with serration or spline on the outer periphery of the rod as shown in FIG. 7. Also, the support rod 5, for example semi-circular in section, may be radially unidirectionally inserted with the pivot 10 having a similarly shaped slot and eccentrically positioned relatively thereto. A plurality of such pivots can be provided and changed to meet the nonuniform drop handle configuration which results from changing the pivotal position of the auxiliary lever 9.

The brake lever of the invention, constructed as aforesaid, is attached to the bent rod section of the drop type handle through the bracket means 1.

A rider operates the bicycle by gripping the straight rod section a, the bent rod section b or the bracket means, at the drop type handle A.

When driving the bicycle at low speed gripping the straight rod section a, and when braking is desired, he pulls the auxiliary lever 9 at the part 9a thereof toward the section a by moving the part 9a with some of his fingers while holding the straight rod section a. The bent head 9c of the auxiliary lever 9 pushes the main lever 6 toward the bent section of the handle A so as to pull the control wire W through the retainer 8 therefor. When driving at middle speed and gripping the bent rod section b or the bracket means 1, he pulls, if braking is required, the part 9a corresponding to the bent rod section b of the handle, or the part 9a toward the straight rod section a with some of his fingers and pulls the main lever 6 toward the bent rod section b with other fingers to thereby actuate the brake. When driving at high speed, he directly pulls, in braking, the main lever 6 toward the bent rod section b thereby effecting the braking action. As best seen from the aforesaid description, the gripping positions and manipulation by the rider's fingers are similar to the disclosure of the U.S. Pat. No. 3,403,577.

Furthermore, referring to FIG. 1, assume that: $l_1$ is the length between the point P of force of the main lever 6 and the fulcrum Q of the lever spindle 7; $l_2$ is the length between Q and the point R of application at the center of the wire retainer 8; $l_3$ is the length between the point P' of force of the auxiliary lever 9 and the fulcrum Q' at the axis of the pivot 10; and $l_4$ is the length between Q' and R, and the ratio of $l_2$ to $l_1$ is constant: about 1:3 in FIG. 1, and the ratio of $l_4$ to $l_3$ can be close or equal to the former ratio, namely, $l_4:L_3$ is approximately 1:4 in FIG. 1.

Usually, the forms and dimensions of both the main and auxiliary levers 6 and 9 should be regular due to the form of the drop handle A to result in a constant ratio of $l_2$ to $l_1$. Hence, when the auxiliary lever 9 is pivotally located in coincidence with the main lever 6, the former is required to be constant in length in order to make the grip dimension d', between the portion 9a of the auxiliary lever 9 and the straight rod section a of the handle A, uniform. As a result, the ratio of $l_4$ to $l_3$ is larger than that of $l_2$ to $l_1$, and thus the ratio of $l_4$ to $l_3$ being about 1:5 in FIG. 1. As a result, the control wire stroke with respect to the stroke of the auxiliary lever 9 is smaller than the control wire stroke with respect to the stroke of the main lever 6 in braking.

While, the invention is directed to locate the pivoting of the auxiliary lever 9 more remote than that of the main lever 6 with respect to the retainer 8, i.e., the fulcrums Q and Q' are so displaced that the ratio of $l_4$ to $l_3$ approaches that of $l_2$ to $l_1$.

Hence, the stroke of the control wire will be approximately unchanged even though the aforesaid grip dimension d' is nearly equal to d, the distance between the main lever 6 and the bent rod section b of the drop handle.

Furthermore, the lever stroke of the auxiliary lever 9, i.e., the aforesaid grip dimension d', can be changed by releasing the set screw 13 shown in the drawings to remove the auxiliary lever 9 from the bracket means and to disengage the pivot 10 from the support rod 5 to to change its position in the slot 1c. The grip dimension d' can be reduced as shown by the dotted lines in FIG. 1.

As clearly understood from the description, the brake lever of the invention has the auxiliary lever shiftable in pivotal location from the stroke of the main lever so that the control wire with respect to the stroke of the auxiliary lever may be approximately equal to the stroke of the control wire with respect to the stroke of the main lever stroke. Also, the variable pivotal position of the auxiliary lever enables the grip dimension between the drop type handle and auxiliary lever to be adjusted to accommodate any variation of the drop handle formation. The adjustment is effected by arranging the pivot of the auxiliary lever eccentrically of the mount spindle thereof, thereby making the brake lever simple in construction and inexpensive to manufacture.

While an embodiment of the invention has been shown and described, the invention is not limited to the specific construction thereof, which is merely exemplified in the specification rather than defined.

What is claimed is:

1. A brake lever means mounted on a drop type bicycle handle comprising a straight rod section and a substantially U-shaped bent rod section extending downward and forward from the straight rod section, said brake lever means comprising:
a bracket means fixed to said bent rod section of the drop type handle;
a lever spindle;
a main lever pivotally mounted above a first axis to said bracket means through said lever spindle, said main lever being substantially parallel to said bent rod section;

a wire retainer on said main lever for retaining one end of a control wire for controlling a brake of the bicycle;

an auxiliary lever pivotally mounted about a second axis to one side outer surface of said bracket means, said second axis being more remote from said wire retainer than said first axis of said main lever, said auxiliary lever being engagable with said main lever to actuate same, whereby the bicycle brake is operable by both said levers, and the position of said second axis is changeable so that the distance between said auxiliary lever and said straight rod section of the drop type handle may be adjusted.

2. The brake lever means according to claim 1, further comprising a mount spindle nonrotatably mounted on said bracket means, said mount spindle being shiftable to a position more remote from said wire retainer than the first main lever pivoting axis and comprising a projection at one axial end thereof which extends outwardly of said one side surface of the bracket means, a pivot means pivotally supporting therewith said auxiliary lever, said projection being within said pivot means, said pivot means being eccentric to the axis of said mount spindle so that variation of the position of the projection within the pivot means varies the axis of said pivot means relative to the axis of said mount spindle.

3. The brake lever means according to claim 2, wherein the outer periphery of said mount spindle, at least at said projection, is polygonal in cross-section, and said pivot means has a corresponding inner surface, polygonal in cross-section, so that the position of the projection in the pivot means may be changed to shift the axis of said pivot means around the axis of said mount spindle.

4. The brake lever means according to claim 2, wherein the outer periphery of said mount spindle, at least said projection, has a large number of equally spaced axially extending grooves defined therein, and said pivot means has an inner periphery having a large number of grooves defined therein which mesh with said grooves in said mount spindle so that the position of the projection in said pivot means may be changed to shift the axis of said pivot means around the axis of said mount spindle.

5. The brake lever means according to claim 2, wherein a through bore is defined in an intermediate portion of said mount spindle, a mount bolt extending through said through bore, and said mount bolt is attached to a tight band for fixing said bracket means to the drop type handle.

* * * * *